United States Patent
Qi et al.

(10) Patent No.: US 11,005,306 B2
(45) Date of Patent: May 11, 2021

(54) DYNAMIC DEADTIME CONTROL IN A WIRELESS TRANSMISSION FUNCTION

(71) Applicant: Integrated Device Technology, Inc., San Jose, CA (US)

(72) Inventors: Tao Qi, San Diego, CA (US); Gustavo Mehas, Mercer Island, WA (US); Chan Young Jeong, San Jose, CA (US); Xinyun Gu, San Jose, CA (US); Nicholaus Smith, La Mesa, CA (US); Amit D. Bavisi, Los Gatos, CA (US); Daryl Sugasawara, San Jose, CA (US); Aihua Lee, Saratoga, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 60 days.

(21) Appl. No.: 16/368,790

(22) Filed: Mar. 28, 2019

(65) Prior Publication Data
US 2020/0204007 A1    Jun. 25, 2020

Related U.S. Application Data

(60) Provisional application No. 62/783,064, filed on Dec. 20, 2018.

(51) Int. Cl.
*H02J 50/70* (2016.01)
*H02J 7/02* (2016.01)
*H02J 50/10* (2016.01)

(52) U.S. Cl.
CPC .............. *H02J 50/70* (2016.02); *H02J 7/025* (2013.01); *H02J 50/10* (2016.02)

(58) Field of Classification Search
CPC ............. H02J 50/70; H02J 50/10; H02J 7/025
USPC ......................................................... 307/104
See application file for complete search history.

(56) References Cited

U.S. PATENT DOCUMENTS

| | | | | |
|---|---|---|---|---|
| 8,976,543 | B1* | 3/2015 | Zheng .................... | H02M 1/38 363/17 |
| 2008/0278125 | A1* | 11/2008 | Pigott .................... | H02M 1/38 323/271 |
| 2009/0027021 | A1* | 1/2009 | Dequina ................ | H02M 1/38 323/282 |
| 2020/0052527 | A1* | 2/2020 | Ettes ...................... | H02J 50/80 |

OTHER PUBLICATIONS

Wang et al., Efficiency Improvement in Adjustable Deadtime of LLC Resonant Converters' 2014, IEEE International Conference on Intelligent Green Building and Smart Grid (IGBSG). (Year: 2014).*

* cited by examiner

*Primary Examiner* — Michael R. Fin
(74) *Attorney, Agent, or Firm* — Haynes and Boone, LLP

(57) ABSTRACT

Embodiments described herein provide a wireless power transmitter that dynamically adjusts the deadtime to reduce power loss. Specifically, the wireless power transmitter includes a transistor circuit for switching a first voltage at a first node and a second voltage at a second node, and a LC circuit coupled between the first node and the second node. The wireless power transmitter further includes a controller coupled to the transistor circuit. The controller is configured to determine whether either of the first voltage and the second voltage is negative during a deadtime of switching. The controller is configured to increment or decrement the deadtime by an adjustment amount depending on whether negative voltage is detected.

18 Claims, 5 Drawing Sheets

DYNAMIC DEADTIME CONTROL IN A WIRELESS TRANSMISSION FUNCTION

CROSS-REFERENCE

This application claims the benefit, under 35 U.S.C. § 119(e), of and commonly-owned U.S. provisional application No. 62/783,064, filed on Dec. 20, 2018, which is hereby expressly incorporated herein by reference.

TECHNICAL FIELD

Embodiments of the present invention are related to wireless transmission of power and, in particular, to controlling a deadtime in a wireless power transmitter.

DISCUSSION OF RELATED ART

Mobile devices, for example smart phones, tablets, wearables and other devices are increasingly using wireless power charging systems. In general, wireless power transfer involves a transmitter driving a transmitter coil and a receiver with a receiver coil placed proximate to the transmitter coil. The receiver coil receives the wireless power generated by the transmitter coil and uses that received power to drive a load, for example to provide power to a battery charger.

There are multiple different standards currently in use for the wireless transfer of power. The more common standards for wireless transmission of power include the Alliance for Wireless Power (A4WP) standard and the Wireless Power Consortium standard, the Qi Standard. Under the Wireless Power Consortium, the Qi specification, an inductive coupling system is utilized to charge a single device with the receiver coil circuit. In the Qi standard, the receiving device coil is placed in close proximity with the transmission coil while in the A4WP standard, the receiving device coil is placed near the transmitting coil, potentially along with other receiving coils that belong to other charging devices.

Typically, a wireless power system includes a transmitter coil that is driven by an alternate current to produce a time-varying magnetic field and a receiver coil, which can be part of a device such as a cell phone, PDA, computer, or other device, that is positioned relative to the transmitter coil to receive the power transmitted in the time-varying magnetic field. Transmission power loss can often happen during the power transfer from the transmitter coil to the receiver coil, which impairs the efficiency of the wireless power charging system.

Therefore, there is a need to increase the efficiency of wireless power transfer.

SUMMARY

In view of the power transfer efficiency problem due to deadtime configuration, embodiments described herein provide a wireless power transmitter that dynamically adjusts the deadtime to reduce power loss. Specifically, the wireless power transmitter includes a transistor circuit for switching a first voltage at a first node and a second voltage at a second node, and a LC circuit coupled between the first node and the second node. The wireless power transmitter further includes a controller coupled to the transistor circuit. The controller is configured to determine whether either of the first voltage and the second voltage is negative (due to body diode of the MOSFET conducting) during a deadtime of switching. When none of the first voltage and the second voltage is negative during the deadtime of switching, the controller is configured to increment the deadtime by an adjustment amount. When one of the first voltage and the second voltage is negative during the deadtime of switching, the controller is configured to decrement the deadtime by the adjustment amount.

These and other embodiments are discussed below with respect to the following figures.

These and other aspects of embodiments of the present invention are further discussed below.

DETAILED DESCRIPTION

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description illustrates inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention.

Figure 1:
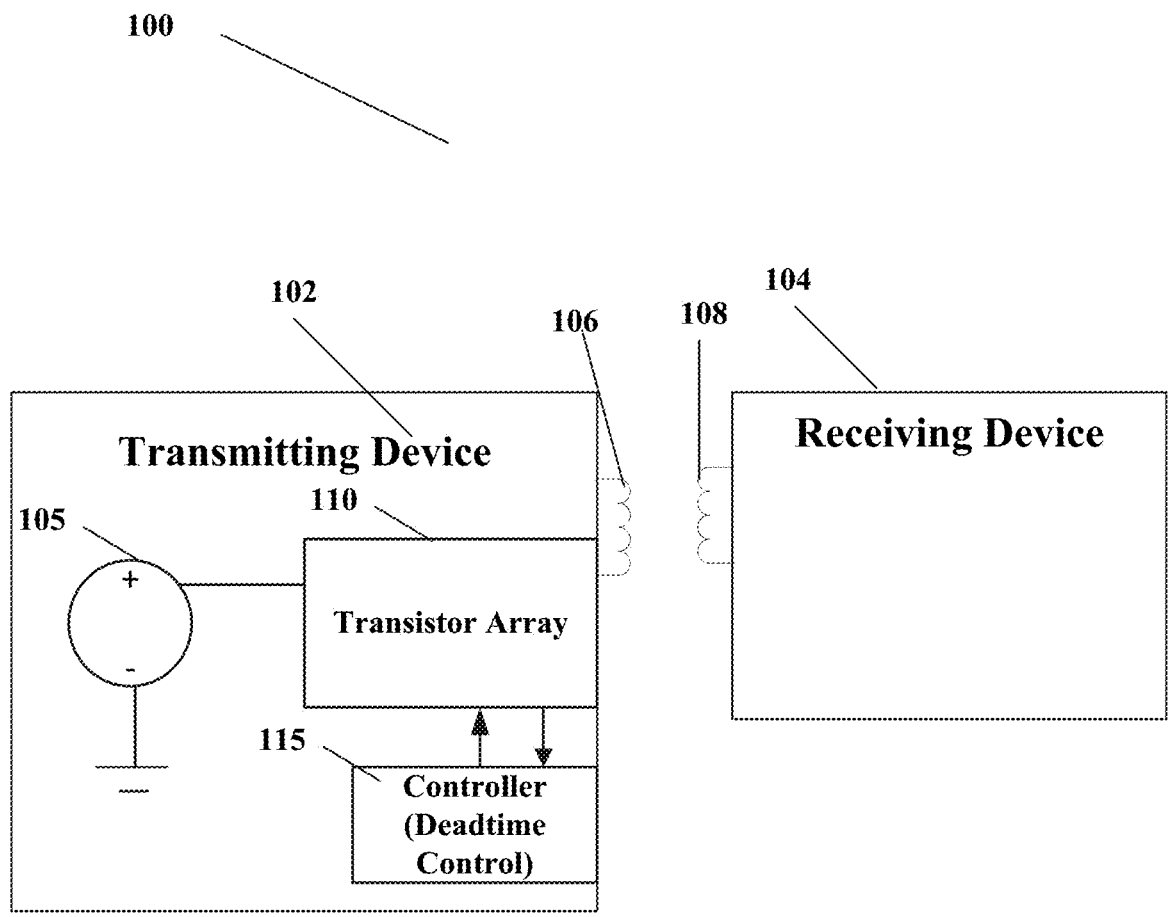
FIG. 1 illustrates a wireless power system having a controller for deadtime control, according to some embodiments.

FIG. 1 illustrates a wireless power system 100 according to some embodiments of the present invention. As illustrated in FIG. 1, a transmitting device 102 transfers wireless power to a receive device 104.

Transmitting device 102 is powered by a direct current (DC) input 105 (e.g., from 5V to 19V, etc.), which can be derived from a Universal Serial Bus (USB) bus or an AC/DC power adapter. The transmitting device 102 includes a switched transistor array 110 coupled to the DC input source 105 and the transmitter coil 106. The transistor array 110 produces an alternate current that is fed to the transmitter coil 106, which in turn generates a time-varying electromagnetic field. In this way, the transmitter coil 106 transfers power to the receiver coil 108 coupled to the receiving device 104 via electromagnetic induction.

The receiver coil 108 is coupled to a rectifier circuit within the receiving device 104, which receives and rectifies wireless power received at the receiver coil 108, and then in turn provides an output voltage for battery charging.

Specifically, the transistor array 110 is controlled by a controller 115 at the transmitting device 102. For example, the controller 115 is configured to control the transistor array 110 to adjust the deadtime in the alternating voltages outputted from the transistor array 110 to reduce power loss. Further details of the structure and operation of the transistor array 110 and controller 115 for dynamic deadtime control are discussed in relation to FIGS. 2-8 below.

Figure 2:
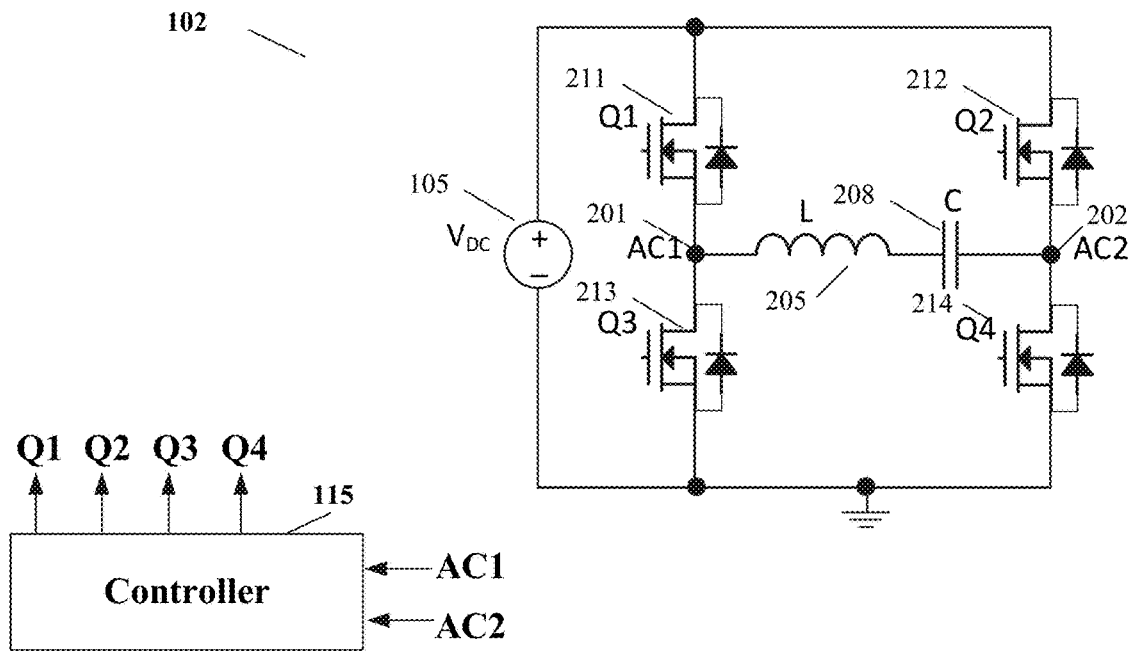
FIG. 2 illustrates an example circuit structure of a wireless power transmitter shown in FIG. 1, according to some embodiments.

FIG. 2 illustrates an example circuit structure of the wireless power transmitter 102 shown in FIG. 1, according to some embodiments. The wireless transmitter 102 includes an LC circuit that includes a series coupled transmitter coil inductor 205 and a capacitor 208. The LC circuit of inductor 205 and capacitor 208 is coupled between the AC1 node 201 and the AC2 node 202.

The LC circuit is driven by an inverter circuit formed by transistor switches 211 (Q1), 212 (Q2), 213 (Q3), and 214 (Q4). Specifically, transistor switches 211 (Q1) and 213 (Q3) are series coupled to form a transistor bridge between the DC voltage input 105 outputting a voltage $V_{DC}$ and ground. The node AC1 201 couples the transistor switches 211 (Q1) and 213 (Q3). Similarly, transistor switches 212 (Q2) and 214 (Q4) are series coupled to form another transistor bridge between voltage input $V_{DC}$ 105 and ground, in parallel to the bridge of transistor switches 211 (Q1) and 213 (Q3). The node AC2 202 couples the transistor switches 212 (Q2) and 214 (Q4).

In some embodiments, each of the transistor switches 211 (Q1), 212 (Q2), 213 (Q3) and 214 (Q4) includes a transistor such as a metal-oxide semiconductor field-effect transistor (MOSFET) which includes a body diode in parallel, or a diode connected in parallel to the transistor.

The controller 115 is configured to control the transistor switches 211 (Q1), 212 (Q2), 213 (Q3), and 214 (Q4) by applying gate voltages to transistors in Q1-Q4. Specifically, in order to provide an AC current through the transmission coil of inductor 205, the gates of the transistors of 211 (Q1), 212 (Q2), 213 (Q3), and 214 (Q4) are controlled such that during one part of a period (e.g., a first half of the duty cycle), transistor switches 211 (Q1) and 214 (Q4) are on while transistor switches 212 (Q2) and 213 (Q3) are off, and during a second part of the period (e.g., the second half of the duty cycle), transistor switches 212 (Q2) and 213 (Q3) are on while transistor switches 211 (Q1) and 214 (Q4) are off. For example, the controller 115 is configured to apply a gate voltage to transistor switches 211 (Q1) and 214 (Q4) and a reverse of the gate voltage to transistor switches 212 (Q2) and 213 (Q3) such that transistor switches 211 (Q1) and transistor switches 214 (Q4), and 212 (Q2) and 213 (Q3) are turned on or off alternately. Thus, the voltage at AC1 node 201 toggles between $V_{DC}$ (when transistor switches 211 (Q1) and 214 (Q4) are on and transistor switches 212 (Q2) and 213 (Q3) are off) and 0 (when transistor switches 211 (Q1) and 214 (Q4) are off and transistor switches 212 (Q2) and 213 (Q3) are on). And the voltage at AC2 node 202 toggles, alternately to the voltage at AC1, between 0 (when transistor switches 211 (Q1) and 214 (Q4) are on and 212 (Q2) and 213 (Q3) are off) and $V_{DC}$ (when transistor switches 211 (Q1) and 214 (Q4) are off and transistor switches 212 (Q2) and 213 (Q3) are on).

In some embodiments, the controller is configured to monitor the alternating voltages from AC1 node 201 and AC2 node 202, and then adjust the timing of the gate voltages for transistor switches 211 (Q1) and 214 (Q4), or transistor switches 212 (Q2) and 213 (Q3), respectively.

Figure 3:
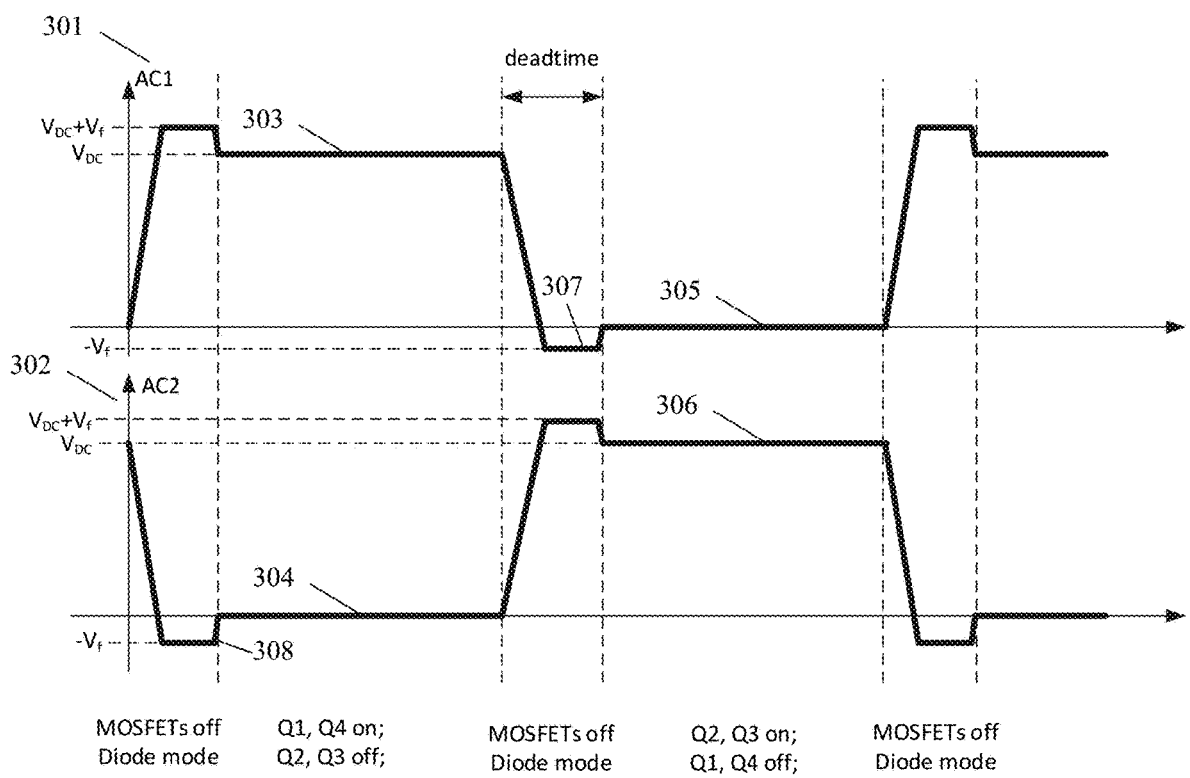
FIG. 3 illustrates example waveforms of the voltages generated to drive a LC circuit within the wireless power transmitter shown in FIG. 2, according to some embodiments.

FIG. 3 illustrates example waveforms of the voltages generated to drive the LC circuit of capacitor 208 and inductor 205 within the wireless power transmitter 102 shown in FIG. 2, according to some embodiments. As illustrated at diagrams 301 and 302 in FIG. 3, during a first part of the cycle, when Q1 and Q4 are on while Q2 and Q3 are off, AC1 node 201 is held at $V_{DC}$ (shown at segment 303) while AC2 node 202 is held at ground (shown at segment 304). During the second part of the cycle, when Q2 and Q3 are on while Q1 and Q4 is off, AC1 node 201 is held at ground (shown at segment 305) while AC2 node 202 is held at $V_{DC}$ (shown at segment 306).

The switching time between the first part and the second part, where the voltage of AC1 node 201 transitions from $V_{DC}$ to ground and the voltage of AC2 node 202 transitions from ground to $V_{DC}$, is referred to as the deadtime. For example, the deadtime is the time interval between high side transistor switches 211 (Q1) and 212 (Q2) conduction and low side transistor switches 213 (Q3) and 214 (Q4) conduction on the same half bridge. The deadtime prevents the event that both high side transistors and low side transistors on the same half bridge are conducting at the same time. A long deadtime will result in switching transients at AC1/AC2 nodes being completed before the deadtime is over. In this case, MOSFETs body diodes are on when the switching transition is finished before the deadtime is over. As illustrated at segment 307 or segment 308, overshoots in the transition (e.g., the voltage drops below zero when transitioning from high to low) may happen when the deadtime is too long. A short deadline results in the switching transition at AC1/AC2 nodes not completed when MOSFETs are turned on. Hard switching will happen in this case.

The switching transient time is determined by coil current, load condition, supply voltage, and AC1/AC2 capacitance, which may vary. The deadtime is a parameter that can be set by firmware or by hardware to accommodate any switching transient time. In some embodiments, the controller 115 is configured to set a deadtime for the transistor array 110.

Figure 4:
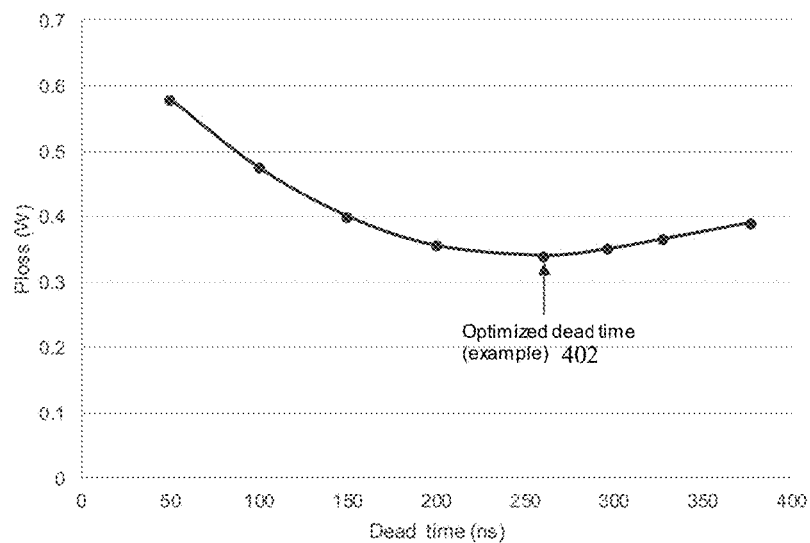
FIG. 4 illustrates an example data plot representing the power loss as a function of deadtime in the wireless power transmitter shown in FIG. 2, according to some embodiments.

FIG. 4 illustrates a graph of power loss versus deadtime for an example wireless transmitter circuit 102 such as that illustrated in FIG. 2. As discussed above, if the deadtime is short, hard switching happens. Thus, energy stored on the AC1/AC2 capacitors is then dissipated through the transistors and through parasitic resistance, resulting in loss of that energy. Conversely, a long deadtime results in operation in a diode mode where the transistor body diodes of transistor switches 211-214 (Q1-Q4) are on. Power loss in a long deadtime is then due to current flowing through the body diode forward voltage. An optimized deadtime, shown at data point 402, which yields the least power loss, may result in avoidance of either hard switching or diode mode.

Figure 5:
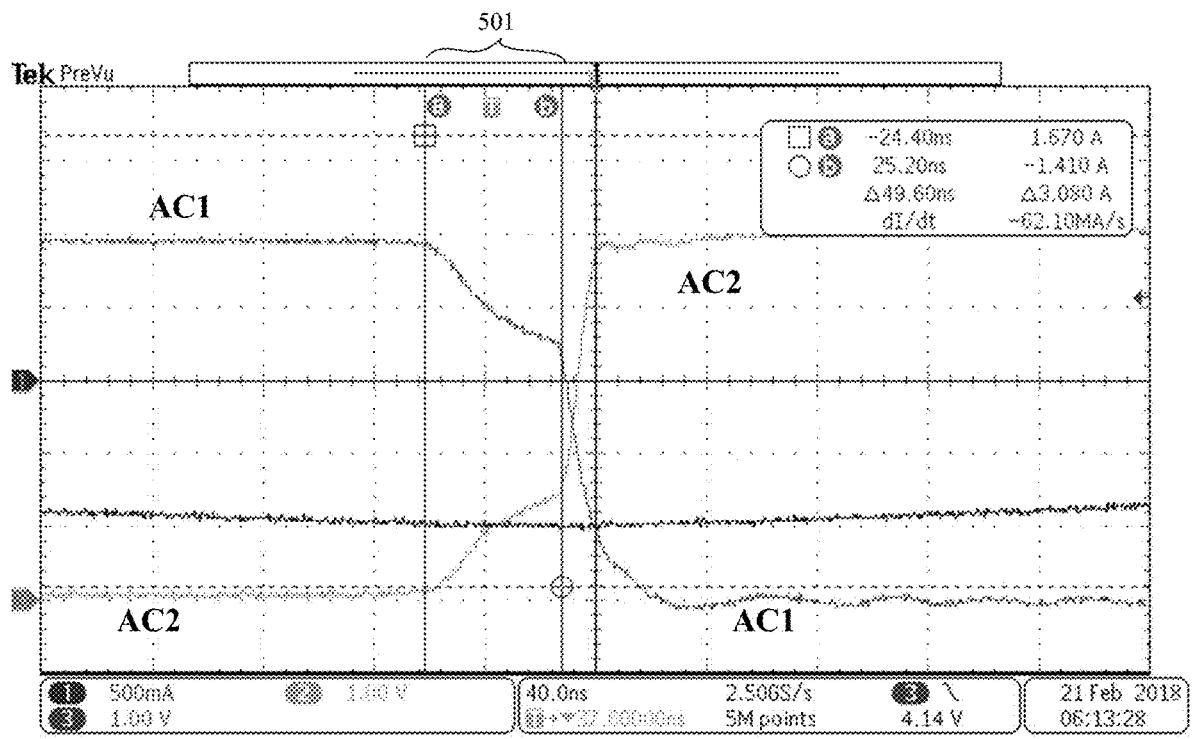
FIGS. 5-7 illustrates example waveforms of the voltages generated to drive the LC circuit within the wireless power transmitter shown in FIG. 2, with different settings of the deadtime, respectively, according to some embodiments.
Figure 6:
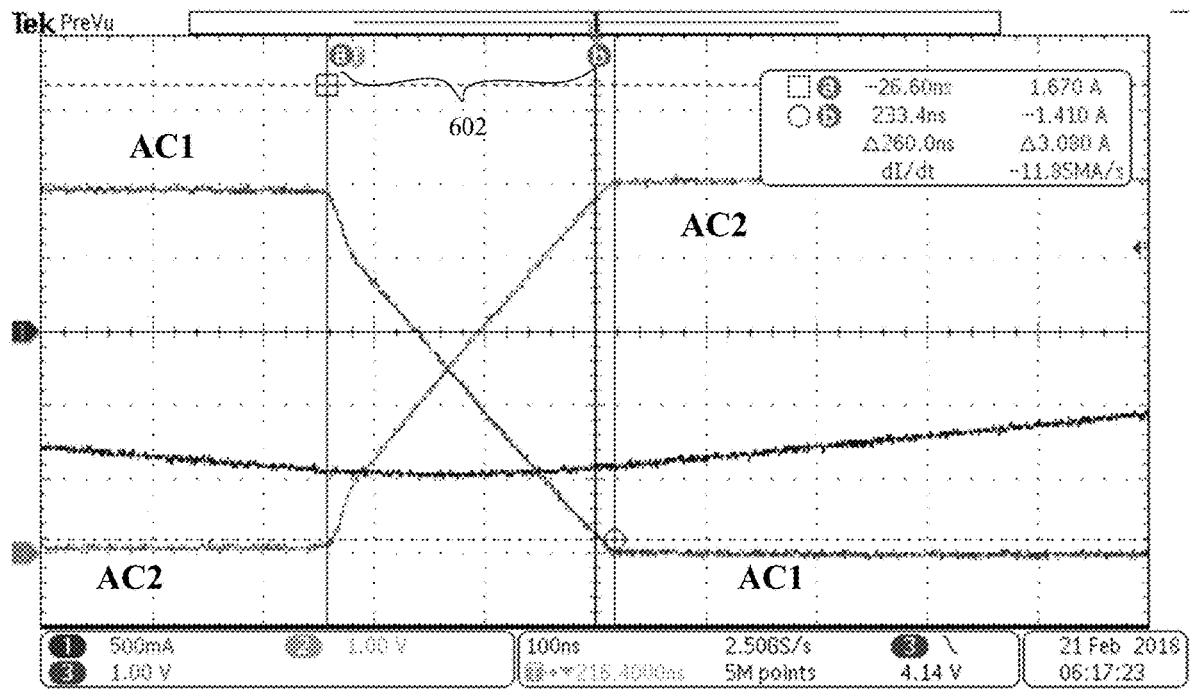
Figure 7:
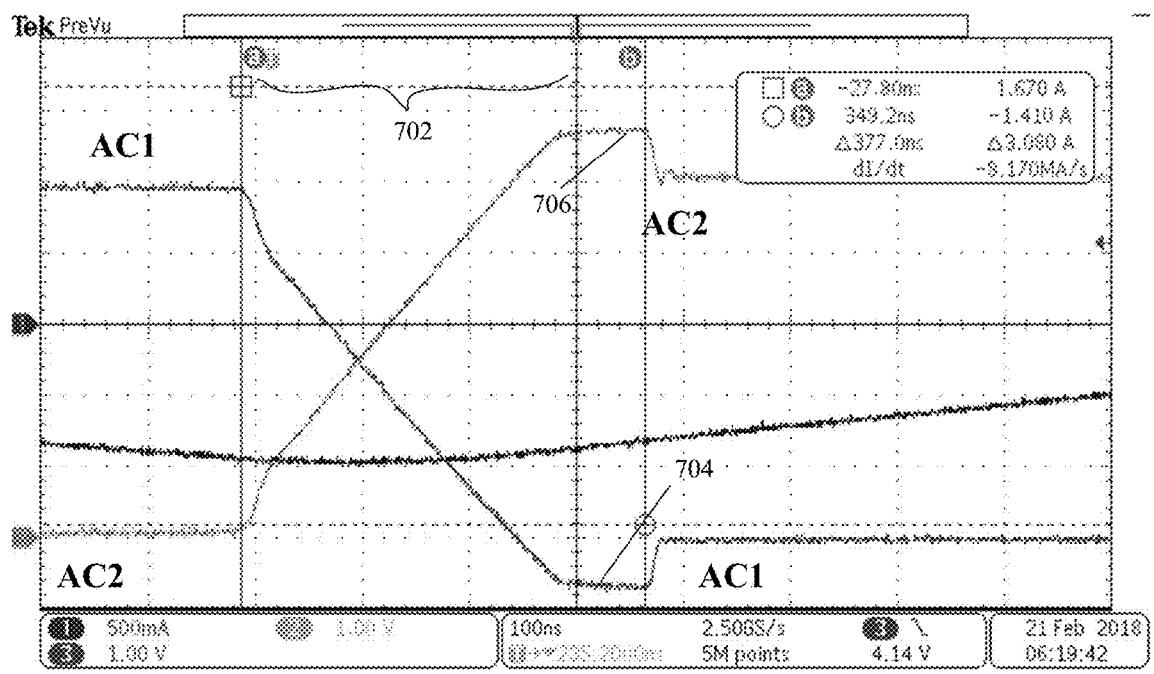

FIGS. 5-7 illustrates example waveforms of the voltages generated to drive the LC circuit within the wireless power transmitter shown in FIG. 2, with different settings of the deadtime, respectively, according to some embodiments. FIG. 5 illustrates a deadtime 501 of 50 ns, which causes the hard-switching after the deadtime. FIG. 6 illustrates a deadtime 602 of 260 ns, which as is illustrated in FIG. 4 substantially close the optimized deadtime, during which the transition from high to low is just completed as the deadtime ends. FIG. 7 illustrates operation with a deadtime 702 of 377 ns, which is within the diode mode realm when the transition from high to low is finished before the deadtime ends. FIG. 7 also illustrates an overshoot with significant negative voltages on AC1 or AC2 nodes during switching. For example, when the AC1 node voltage is going from a high voltage to a low voltage, the voltage can overshoot to a negative voltage shown at segment 704. Meanwhile, when the AC2 node voltage is going from low to high, the voltage can overshoot to a larger positive voltage shown at segment 706 during the switching.

Consequently, in accordance with some embodiments, the controller 115 is configured to perform a dynamic deadtime optimization function. In some embodiments, the controller 115 can include a zero-crossing detection circuit block that can detect, as illustrated in FIG. 7, when AC1 or AC2 transitions to a negative voltage, which indicates an operation in the diode mode. Consequently, if a negative voltage is detected, indicating the voltage has completed transition from high to low before the deadtime ends, then the deadtime can be decremented. If no negative voltage is detected, indicating the voltage may not have completed transitioning from high to low before the deadtime ends, then the deadtime can be incremented. Consequently, no matter the initial value of deadtime, eventually the deadtime will converge at the optimum deadtime.

Figure 8:
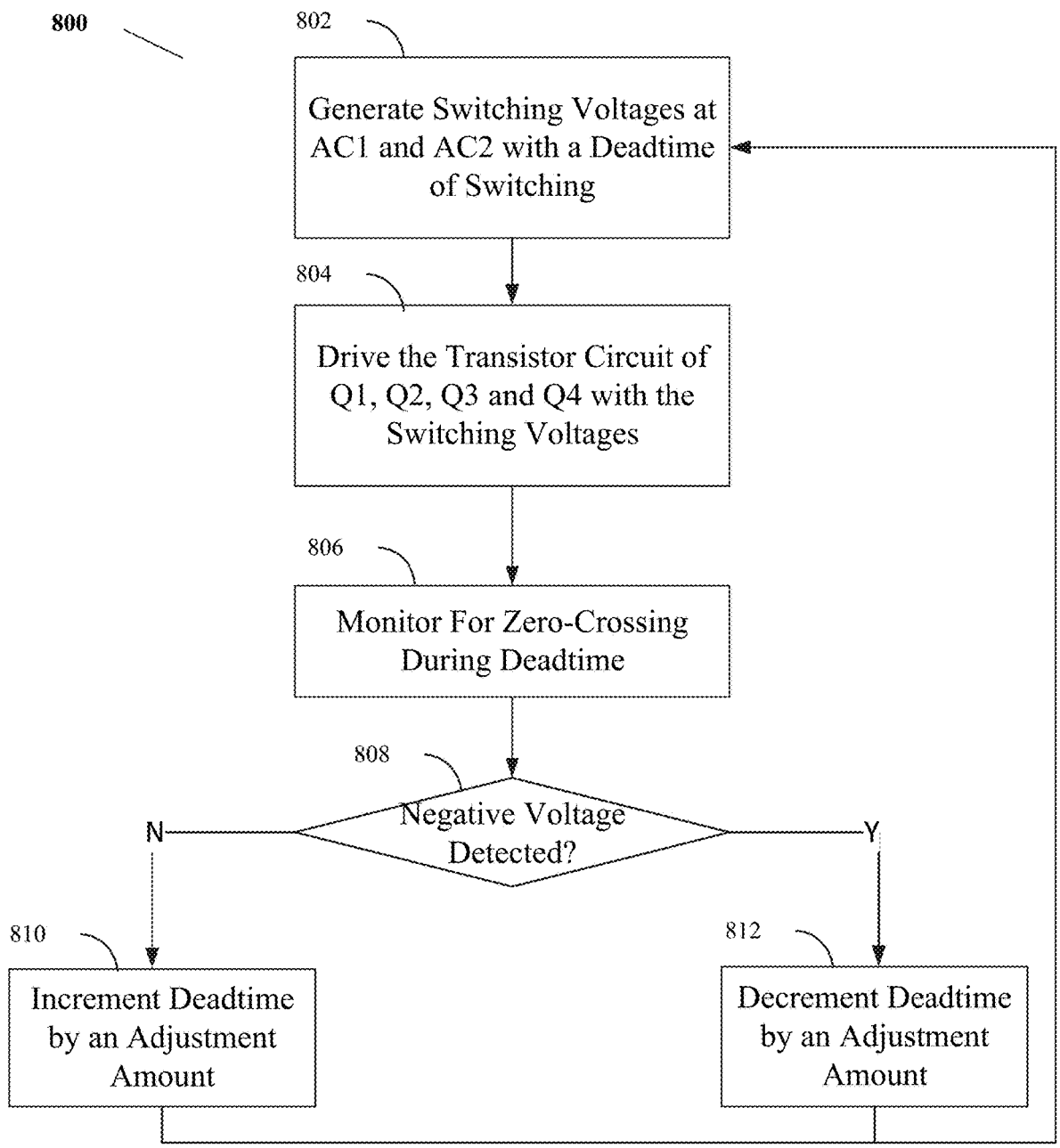
FIG. 8 illustrates an example logic flow diagram showing a process of dynamically control the deadtime to reduce power loss at the wireless transmitter shown in FIG. 2, according to some embodiments.

FIG. 8 illustrates an example logic flow diagram showing a process 800 of dynamically control the deadtime to reduce power loss at the wireless transmitter shown in FIG. 2, according to some embodiments. At step 802, switching voltages at AC1 node and AC2 node in the transistor array 110 are generated with a deadtime of switching. At step 804, the LC circuit (205 and 208) are driven by the switching voltages. At step 806, the zero-crossing is monitored to detect a negative voltage on nodes AC1 and/or AC2 during the deadtime. At step 808, the controller determines whether the voltage at either of AC1 and AC2 nodes is negative during the deadtime of switching. At step 812, when negative voltage is detected, the deadtime is decremented by an adjustment value. At step 810, when no negative voltage is detected, the deadtime is incremented by the adjustment value. The adjustment value may be pre-determined, e.g., 5 ns, 10 ns, 15 ns, etc.

The above detailed description is provided to illustrate specific embodiments of the present invention and is not intended to be limiting. Numerous variations and modifications within the scope of the present invention are possible. The present invention is set forth in the following claims.

What is claimed is:

1. A wireless power transmitter, comprising:
 a transistor circuit for switching a first voltage at a first node and a second voltage at a second node;
 a LC circuit coupled between the first node and the second node; and
 a controller coupled to the transistor circuit, the controller configured to:
  determine whether either of the first voltage and the second voltage is negative during a deadtime of switching,
  increment the deadtime by an adjustment amount when none of the first voltage and the second voltage is negative during the deadtime of switching, and
  decrement the deadtime by the adjustment amount when one of the first voltage and the second voltage is negative during the deadtime of switching.

2. The wireless power transmitter of claim 1, wherein the transistor circuit receives an input voltage at a first transistor bridge and a second transistor bridge in parallel to the first transistor bridge.

3. The wireless power transmitter of claim 2, wherein the first transistor bridge includes a first transistor switch and a second transistor switch, connected through the first node, and
 the second transistor bridge includes a third transistor switch and a fourth transistor switch connected through the second node.

4. The wireless power transmitter of claim 3, wherein the controller applies a first gate voltage to the first transistor switch and the fourth transistor switch and a reverse of the first gate voltage to the second transistor switch and the third transistor switch such that the first and the fourth transistor switches, and the second and the third transistor switches are turned on or off alternately.

5. The wireless power transmitter of claim 3, wherein the first voltage is fed to the first transistor switch and the fourth transistor switch as a first gate voltage, and the second voltage is fed to the second transistor switch and the third transistor switch as a second gate voltage.

6. The wireless power transmitter of claim 4, wherein the first voltage at the first node switches between a value equivalent to the input voltage and zero with a first deadtime of switching, and
 the second voltage at the second node switches, reversely to the first voltage, between zero and the value equivalent to the input voltage with a second deadtime of switching.

7. The wireless power transmitter of claim 1, wherein the deadtime is set with the incremented or decremented adjustment amount, and wherein the controller is further configured to:
 operate the transistor circuit with the deadtime with the incremented or decremented adjustment amount.

8. A method for dynamically controlling a deadtime of voltage switching in a wireless power transmitter, comprising:
 generating switching voltages at a first node and a second node of a transistor circuit with a deadtime;
 driving, by the switching voltages, a LC circuit coupled between the first node and the second node;
 determining whether either of the first voltage and the second voltage is negative during the deadtime of switching;
 incrementing the deadtime by a first adjustment amount when none of the first voltage and the second voltage is negative during the deadtime of switching, and
 decrementing the deadtime by a second adjustment amount when one of the first voltage and the second voltage is negative during the deadtime of switching.

9. The method of claim 8, further comprising:
 receiving an input voltage at the transistor circuit having a first transistor bridge and a second transistor bridge in parallel to the first transistor bridge,
  wherein the first transistor bridge includes a first transistor switch and a second transistor switch, connected through the first node, and
  the second transistor bridge includes a third transistor switch and a fourth transistor switch connected through the second node.

10. The method of claim 9, wherein the generating switching voltages at the first node and the second node of a transistor circuit with a deadtime comprises:
turning on or off the first and the fourth transistor switches, and the second and the third transistor switches alternately by:
applying a first gate voltage to the first transistor switch and the fourth transistor switch and a reverse of the first gate voltage to the second transistor switch and the third transistor switch.

11. The method of claim 9, further comprising:
feeding the first voltage to the first transistor switch and the fourth transistor switch as a first gate voltage; and
feeding the second voltage to the second transistor switch and the third transistor switch as a second gate voltage.

12. The method of claim 10, further comprising:
causing the first voltage at the first node to switch between a value equivalent to the input voltage and zero with a first deadtime of switching, and
causing the second voltage at the second node to switch, reversely to the first voltage, between zero and the value equivalent to the input voltage with a second deadtime of switching.

13. The method of claim 8, further comprising:
setting the deadtime with the incremented or decremented adjustment amount via firmware or hardware; and
operating the transistor circuit with the deadtime with the incremented or decremented adjustment amount.

14. A system for dynamically controlling a deadtime of voltage switching in a wireless power transmitter, comprising:
means for generating switching voltages at a first node and a second node of a transistor circuit with a deadtime;
means for driving, by the switching voltages, a LC circuit coupled between the first node and the second node;
means for determining whether either of the first voltage and the second voltage is negative during the deadtime of switching;
means for incrementing the deadtime by a first adjustment amount when none of the first voltage and the second voltage is negative during the deadtime of switching, and
means for decrementing the deadtime by a second adjustment amount when one of the first voltage and the second voltage is negative during the deadtime of switching.

15. The system of claim 14, further comprising:
means for receiving an input voltage at the transistor circuit having a first transistor bridge and a second transistor bridge in parallel to the first transistor bridge,
wherein the first transistor bridge includes a first transistor switch and a second transistor switch, connected through the first node, and
the second transistor bridge includes a third transistor switch and a fourth transistor switch connected through the second node.

16. The system of claim 15, wherein the means for generating switching voltages at the first node and the second node of a transistor circuit with a deadtime comprises:
means for turning on or off the first and the fourth transistor switches, and the second and the third transistor switches alternately by:
means for applying a first gate voltage to the first transistor switch and the fourth transistor switch and a reverse of the first gate voltage to the second transistor switch and the third transistor switch.

17. The system of claim 15, further comprising:
means for feeding the first voltage to the first transistor switch and the fourth transistor switch as a first gate voltage; and
means for feeding the second voltage to the second transistor switch and the third transistor switch as a second gate voltage.

18. The system of claim 16, further comprising:
means for causing the first voltage at the first node to switch between a value equivalent to the input voltage and zero with a first deadtime of switching, and
means for causing the second voltage at the second node to switch, reversely to the first voltage, between zero and the value equivalent to the input voltage with a second deadtime of switching.

* * * * *